THOMAS FELL.
Improvement in Animal Traps.
No. 119,592.  Patented Oct. 3, 1871.
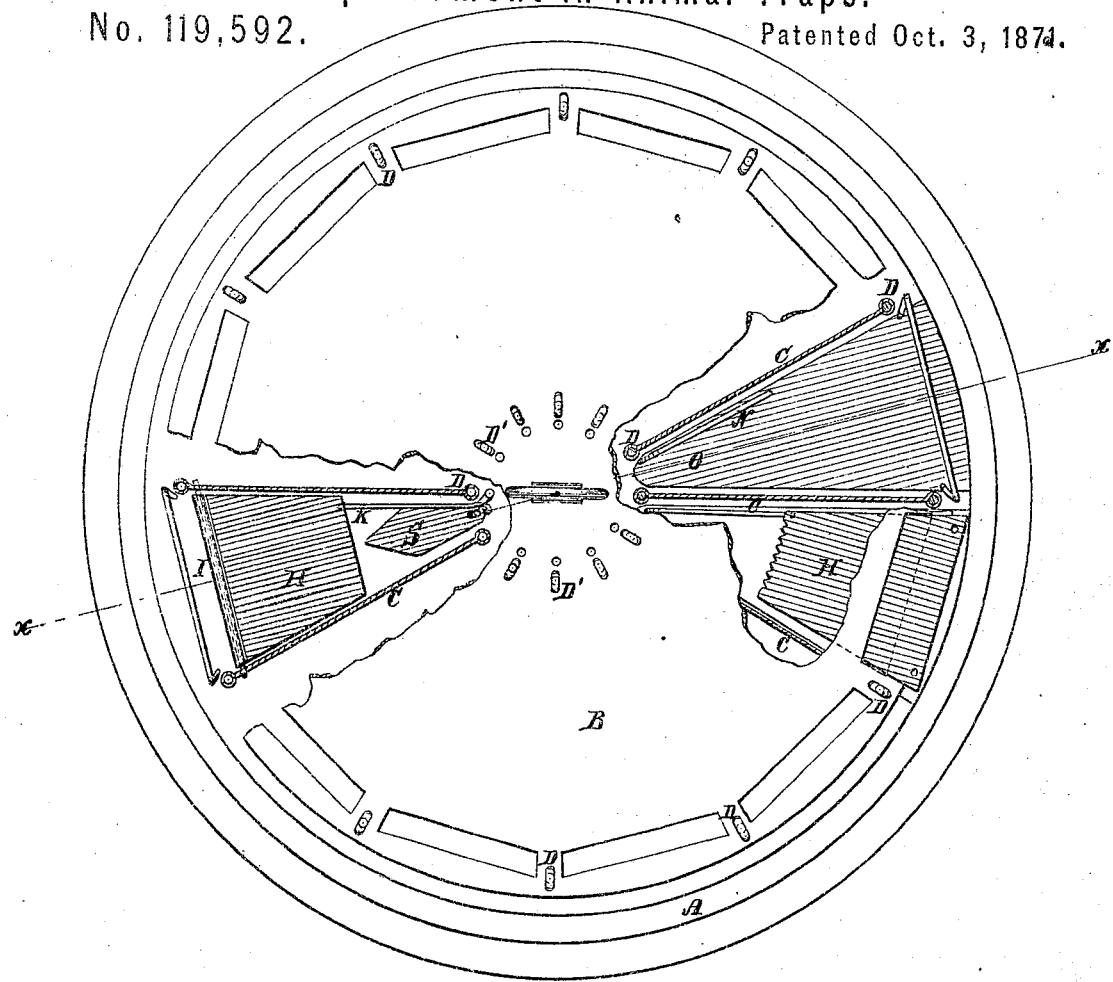
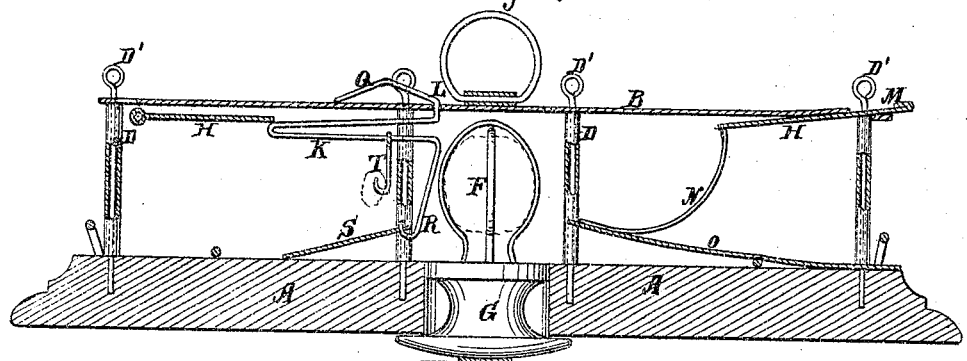
Witnesses:  
A. Bennerkendorf  
Frances McArdle
Inventor:  
Thos. Fell  
per Munn & Co  
Attorneys.

UNITED STATES PATENT OFFICE.

THOMAS FELL, OF NEW YORK, N. Y.

IMPROVEMENT IN ANIMAL-TRAPS.

Specification forming part of Letters Patent No. 119,592, dated October 3, 1871.

*To all whom it may concern:*

Be it known that I, THOMAS FELL, of the city of New York, in the county and State of New York, have invented a new and Improved Animal-Trap; and I do hereby declare that the following is a full, clear, and exact description thereof, which will enable others skilled in the art to make and use the same, reference being had to the accompanying drawing forming part of this specification.

My invention relates to improvements in animal-traps; and it consists in a number of cells formed in a circle around a common center, between two horizontal plates, one supported above the other by vertical and radial partitions, which separate the cells from each other, the said plates and partitions being held together by detachable pins in such manner that the parts may be readily separated for cleaning them, as is required, to remove the scents which are attached to the traps by use and cause them to be avoided by the animals. Each cell is provided with a door at the mouth, to be let fall when the bait is disturbed and secure the animal, all as hereinafter described.

Figure 1 is partly a plan view and partly a horizontal section of my improved trap, and Fig. 2 is a vertical section taken on the line $x\ x$, Fig. 1.

Similar letters of reference indicate corresponding parts.

A and B are the two horizontal plates or disks, which may be of sheet or cast metal; or the lower one may be a piece of board covered with sheet metal. C represents the partitions. They are preferably made of sheet metal, and have a tubular formation, D, at each end, for being confined in their vertical and radial positions by the pins D′, which pass through the upper plate, the tubes, and into or through the lower plate, securing them all together to form a case or shell, which may be readily taken apart for cleaning. These partitions do not extend quite to the center of the plates A and B, leaving a space thereat, into which a bait-holder, F, may be introduced through the bottom plate. Said bait-holder may consist of hooks, wires, pins, or any suitable contrivance for holding the bait, applied to a plate or block, G, adapted to occupy and close the hole provided for it in one of the plates. H represents the door, to be let fall by the moving of the bait and close the entrance to the cells behind the animals after entering. These may be either hinged or pivoted, as at I, to be held up by a bent wire, K, arranged in the upper plate, as at L, to swing from under the edge of the plate, or they may be placed in a slot in the upper plate, as at M, to be held by the same device K, or it may be by a wire, N, on a delicate springing part, O, of the floor of the cell, which will be pressed down to trip the wire by the weight of the animal. The tripping-wire K has an arm, X, extending up through the top plate, to be used in setting it to hold the door up; and it has a hook, R, pendent from the upper part, to hold a treadle, S, which will cause it to swing when the animal steps on it. A hook, T, is suspended on the wire K for holding bait.

Having thus described my invention, I claim as new and desire to secure by Letters Patent—

1. The combination of the plates A B C and detachable pins D, all being constructed and arranged substantially as specified.

2. The arrangement, with the falling doors, of the holding and tripping wire K Q, substantially as specified.

THOMAS FELL.

Witnesses:
   GEO. W. MABEE,
   ALEX. F. ROBERTS. (51)